United States Patent
Woo et al.

(10) Patent No.: US 7,366,180 B2
(45) Date of Patent: Apr. 29, 2008

(54) HYBRID BASE STATION TRANSCEIVER FOR PLURAL NETWORKS

(75) Inventors: Moo-Yeon Woo, Seongnam-si (KR); Gui-Jung Lee, Yongin-si (KR); Chang-Young Song, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 414 days.

(21) Appl. No.: 10/959,578

(22) Filed: Oct. 7, 2004

(65) Prior Publication Data

US 2005/0078618 A1    Apr. 14, 2005

(30) Foreign Application Priority Data

Oct. 8, 2003    (KR)    ............... 10-2003-0072827

(51) Int. Cl.
*H04L 12/56* (2006.01)

(52) U.S. Cl. .............. 370/395.5; 370/466; 370/395.31; 370/469; 455/561; 455/428

(58) Field of Classification Search ................ 370/328, 370/395.1, 395.64, 395.52, 395.53, 395.54, 370/395.65, 401, 420, 329, 467, 466, 469, 370/474, 471, 331, 338, 310.1, 310.2, 395.5, 370/395.31, 351, 352; 455/561, 424, 425, 455/456.5, 456.6, 435.2, 422.1, 414.4, 550.1, 455/575.1, 555, 560, 436, 435.1, 445, 452.1, 455/428, 432.2, 432.1, 433, 426.1, 507, 552.1, 455/414.1, 466, 438, 426.2, 456.3, 557, 556.1
See application file for complete search history.

(56) References Cited

U.S. PATENT DOCUMENTS 5,623,605 A * 4/1997 Keshav et al. .............. 709/236

6,275,494 B1 * 8/2001 Endo et al. ............. 370/395.52
6,330,239 B1 * 12/2001 Suzuki ..................... 370/395.1
6,471,411 B2 * 10/2002 Von Hackewitz ........... 384/574

(Continued)

FOREIGN PATENT DOCUMENTS

JP    2002-517948    6/2002

(Continued)

OTHER PUBLICATIONS

European Office Action of the European Patent Application No. 04 02 3783, mailed on Aug. 22, 2005.

(Continued)

*Primary Examiner*—Edward F. Urban
*Assistant Examiner*—Charles Chow
(74) *Attorney, Agent, or Firm*—Robert E. Bushnell, Esq.

(57) ABSTRACT

A hybrid base station transceiver has an ATM matching unit for connecting a wireless terminal to an ATM-based communication network; an IP matching unit for connecting a wireless terminal to an IP-based communication network; a channel and RF processor for performing physical connection protocol processing and RF transceiving processing with the wireless terminal; and a routing processor for determining which network to which the wireless terminal is to connect to by analyzing a signal of OSI Layer 2 or Layer 3 received from the wireless terminal and for connecting the wireless terminal to the ATM-based or IP-based communication network through the channel and RF processor according to the analysis.

9 Claims, 10 Drawing Sheets

U.S. PATENT DOCUMENTS

| | | |
|---|---|---|
| 6,522,641 B1 | 2/2003 | Siu et al. |
| 6,535,732 B1* | 3/2003 | McIntosh et al. ............ 455/445 |
| 6,539,237 B1 | 3/2003 | Sayers et al. |
| 6,625,169 B1* | 9/2003 | Tofano ........................ 370/466 |
| 6,728,261 B1* | 4/2004 | Sasson et al. ................ 370/466 |
| 6,801,542 B1* | 10/2004 | Subbiah ....................... 370/467 |
| 6,879,592 B1* | 4/2005 | Hirayama et al. ........ 370/395.1 |
| 6,931,005 B1* | 8/2005 | Wilhelm ...................... 370/390 |
| 6,980,553 B2* | 12/2005 | Miki et al. ................ 370/395.1 |
| 2001/0055300 A1* | 12/2001 | Chen ........................... 370/352 |
| 2002/0163902 A1* | 11/2002 | Takao et al. ................. 370/338 |
| 2003/0063582 A1* | 4/2003 | Mizell et al. ................ 370/328 |
| 2003/0063616 A1 | 4/2003 | Lee |
| 2003/0069013 A1 | 4/2003 | Lee et al. |
| 2003/0100300 A1 | 5/2003 | Yang et al. |
| 2003/0100342 A1 | 5/2003 | Ham et al. |
| 2003/0161281 A1* | 8/2003 | Dulin et al. ................. 370/328 |
| 2004/0062251 A1* | 4/2004 | Johansson et al. ...... 370/395.52 |
| 2004/0240469 A1* | 12/2004 | Stumpert et al. ............ 370/466 |
| 2005/0047355 A1* | 3/2005 | Wood et al. ................. 370/310 |
| 2006/0114856 A1* | 6/2006 | Hirata et al. ................. 370/331 |
| 2006/0193322 A1* | 8/2006 | Jabbari et al. .............. 370/389 |

FOREIGN PATENT DOCUMENTS

| | | |
|---|---|---|
| JP | 2003-198726 | 7/2003 |
| JP | 2003-523658 | 8/2003 |
| WO | WO 99/53668 | 10/1999 |
| WO | WO 01/50795 | 7/2001 |

OTHER PUBLICATIONS

Australian Office Action of the Australian Patent Application No. 2004214585, mailed on Nov. 17, 2005.

Japanese Office Action for corresponding Japanese Patent Application No. 2004-293204, issued on Oct. 17, 2006.

* cited by examiner

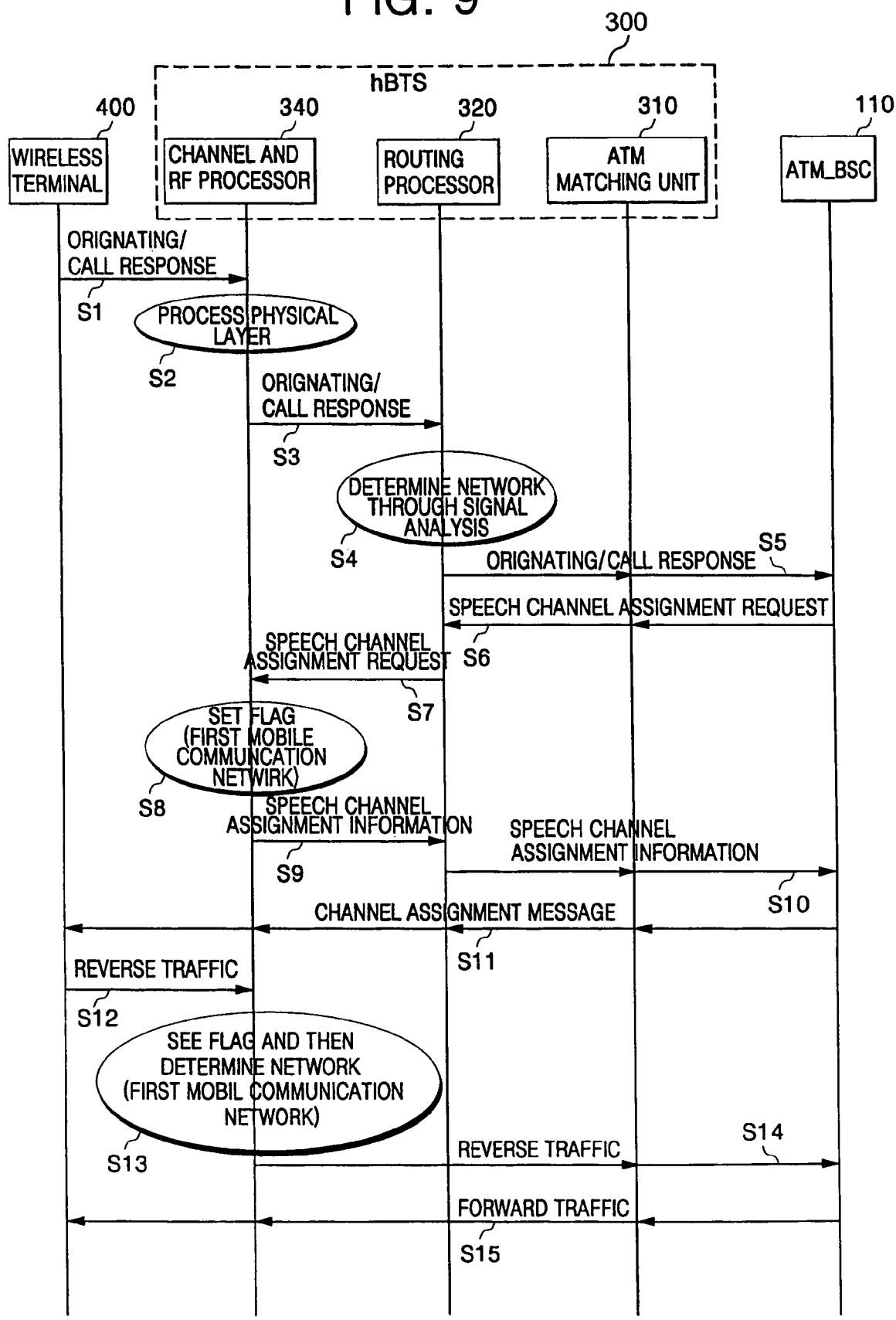

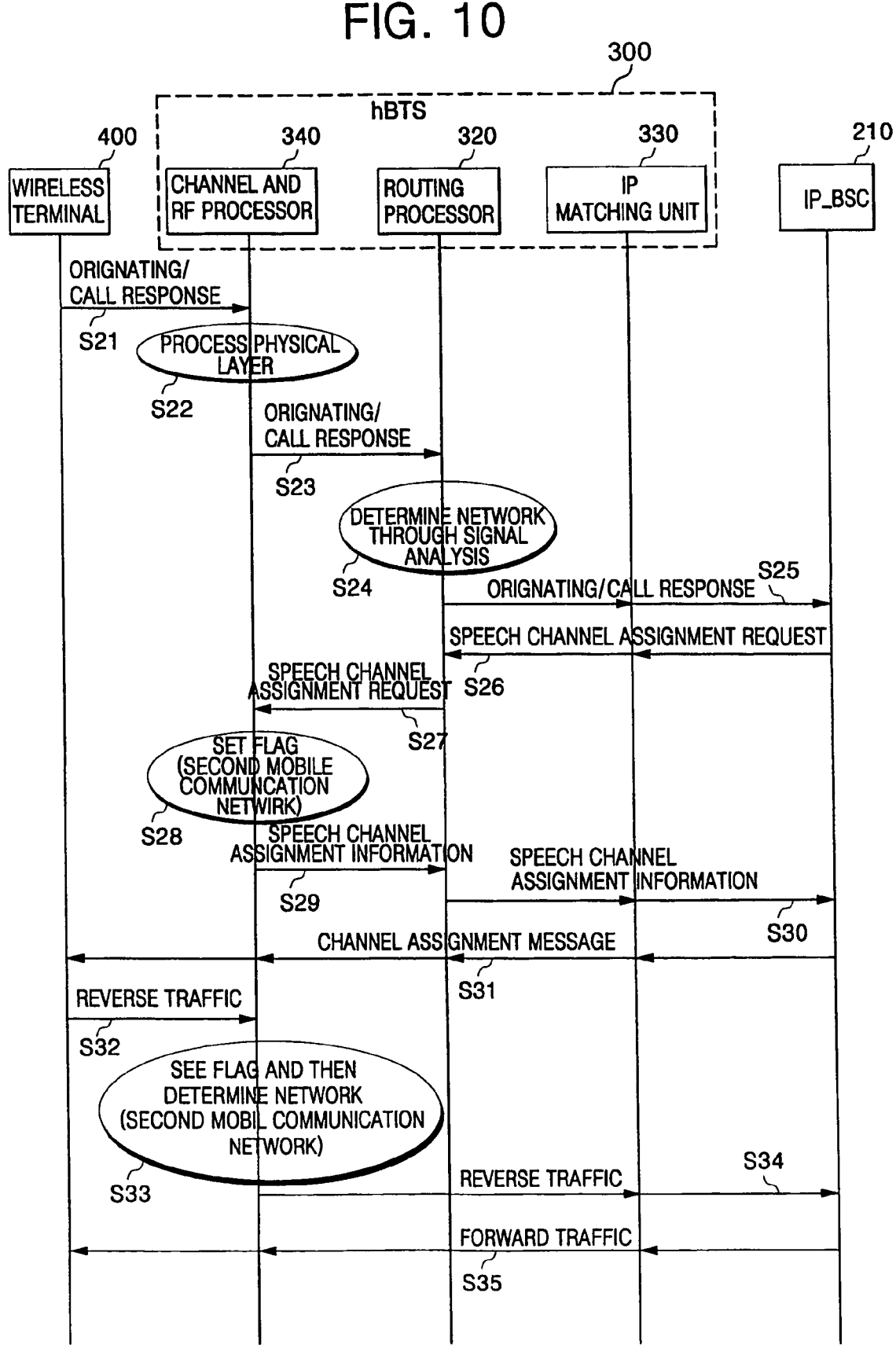

US 7,366,180 B2

HYBRID BASE STATION TRANSCEIVER FOR PLURAL NETWORKS

CLAIM OF PRIORITY

This application makes reference to, incorporates the same herein, and claims all benefits accruing under 35 U.S.C. § 119 from an application for HYBRID BASE TRANSCEIVER STATION earlier filed in the Korean Intellectual Property Office on 8 Oct. 2003 and there duly assigned Serial No. 2003-72827.

BACKGROUND OF THE INVENTION

1. Field of the Invention

The present invention relates to a hybrid Base Station Transceiver (hBTS), and more particularly, to a base station transceiver that interlocks with first and second mobile communication networks which use different communication protocols each other. More particularly, the present invention relates to a hybrid base station transceiver, which supports an asynchronous transfer mode (ATM) protocol and an Internet protocol (IP) so that it interlocks with an ATM-based mobile communication network and an IP-based mobile communication network.

2. Description of the Related Art

A third generation mobile communication system that is currently commercially used has a base station transceiver (hereinafter referred to as "BTS"), a base station controller (hereinafter referred to as "BSC"), and a mobile switching center (hereinafter referred to as "MSC"), whose network is designed on the basis of an asynchronous transfer mode (ATM) protocol. Meanwhile, according to a trend of technical development that the next generation voice and data communication network is integrated on the basis of an internet protocol (IP), studies to introduce IP technology in the mobile communication network are undertaken. Also, studies of technology that existing mobile communication networks such as GSM (Global System for Mobile communication or Group Special Mobile), CDMA (Code Division Multiple Access) and UMTS (Universal Mobile Telecommunication(s) System) and an IP (Internet Protocol) based mobile communication network are interlocked as an interim form of the next generation communication network where networks are integrated into All-IP is undertaken. One example of it is disclosed in the U.S. Pat. No. 6,539,237 to Ian Leslie Sayers et al. entitled METHOD AND APPARATUS FOR INTEGRATED WIRELESS COMMUNICATIONS IN PRIVATE AND PUBLIC NETWORK ENVIRONMENTS, incorporated by reference herein, which describes technology that an existing mobile communication network is interlocked with a private IP mobile communication network.

SUMMARY OF THE INVENTION

It is an objective of the present invention to provide a hybrid base station apparatus where different kinds of mobile communication networks, each using different protocols, have each of the protocols in a communication environment operated independently and are interlocked with each of the mobile communication networks.

According to an aspect of the present invention, a hybrid base station transceiver comprises: a first matching unit for processing a first protocol used to connect to a first mobile communication network; a second matching unit for processing a second protocol used to connect to a second mobile communication network; a channel and RF (radio frequency) processor for performing a physical connection protocol process and an RF transceiving process with a wireless terminal; and a routing processor for determining a network to which a corresponding wireless terminal wishes to connect by analyzing a signal received from the wireless terminal and for connecting the network to any one of the first and second mobile communication networks when a signal of open system interconnection (OSI) Layer 2 or Layer 3 is processed with the wireless terminal connected through the channel and RF processor.

According to another aspect of the present invention, a hybrid base station transceiver comprises: an ATM matching unit for processing an ATM protocol used to connect to an ATM-based first mobile communication network; an IP matching unit for processing an IP protocol used to connect to an IP-based second mobile communication network; a channel and RF processor for performing a physical connection protocol process and an RF transceiving processing with a wireless terminal; and a routing processor for determining a network to which a corresponding wireless terminal wishes to connect by analyzing a signal received from the wireless terminal and for connecting the network to anyone of the ATM-based first mobile communication network and the IP-based second mobile communication network when a signal of Layer 2 or Layer 3 is processed with the wireless terminal connected through the channel and RF processor.

According to yet another aspect of the present invention, a mobile communication system comprises: a first mobile communication network for providing an ATM-based mobile communication service; a second mobile communication network for providing an IP-based mobile communication service; and a hybrid base station transceiver for performing call processing of an ATM scheme when the station is interlocked with an ATM-based first mobile communication network, and for performing call processing of an IP scheme when the station is interlocked with an IP-based second mobile communication network with an ATM protocol and an IP protocol.

According to yet another aspect of the present invention, a method for performing call processing in a hybrid base station transceiver, the method comprises: processing a physical layer on a wireless connection protocol with respect to a response call for any one of an outgoing signal and a call received from a wireless terminal; performing an analysis of Layer 2 and Layer 3 on the wireless connection protocol with respect to the received signal and determining which one of a first protocol-based first mobile communication network and a second protocol-based second mobile communication network the received signal is to be transmitted to; and transmitting the signal to the first mobile communication network by performing first protocol processing when transmitting the received signal to the first mobile communication network as a result of the determination, and transmitting the signal to the second mobile communication network by performing second protocol processing when transmitting the received signal to the second mobile communication network as a result of the determination.

According to yet another aspect of the present invention, a method for performing call processing in a hybrid base station transceiver, the method comprises: processing a physical layer on a wireless connect protocol with respect to a response call for any one of an outgoing signal and a call received from a wireless terminal; performing an analysis of Layer 2 and Layer 3 on the wireless connection protocol with respect to the received signal and determining which one of an ATM-based first mobile communication network and an IP-based second mobile communication network the received signal is to be transmitted to; and transmitting the signal to the ATM-based first mobile communication network by performing ATM protocol processing when transmitting the received signal to the ATM-based first mobile communication network as a result of the determination, and transmitting the received signal to the IP-based second mobile communication network by performing IP protocol processing when transmitting the received signal to the IP-based second mobile communication network as a result of the determination.

BRIEF DESCRIPTION OF THE DRAWINGS

A more complete appreciation of the, present invention, and many of the attendant advantages thereof, will become readily apparent as the same becomes better understood by reference to the following detailed description when considered in conjunction with the accompanying drawings in which like reference symbols indicate the same or similar components, wherein:

FIG. 9 is a call flowchart in the case of connecting to an ATM (asynchronous transfer mode) based mobile communication network in accordance with the present invention;

FIG. 10 is a call flowchart in the case of connecting to an IP (Internet Protocol) based second mobile communication network in accordance with the present invention.

DETAILED DESCRIPTION OF THE INVENTION

Hereinafter, the present invention will be described in detail with reference to the accompanying drawing.

Figure 1:
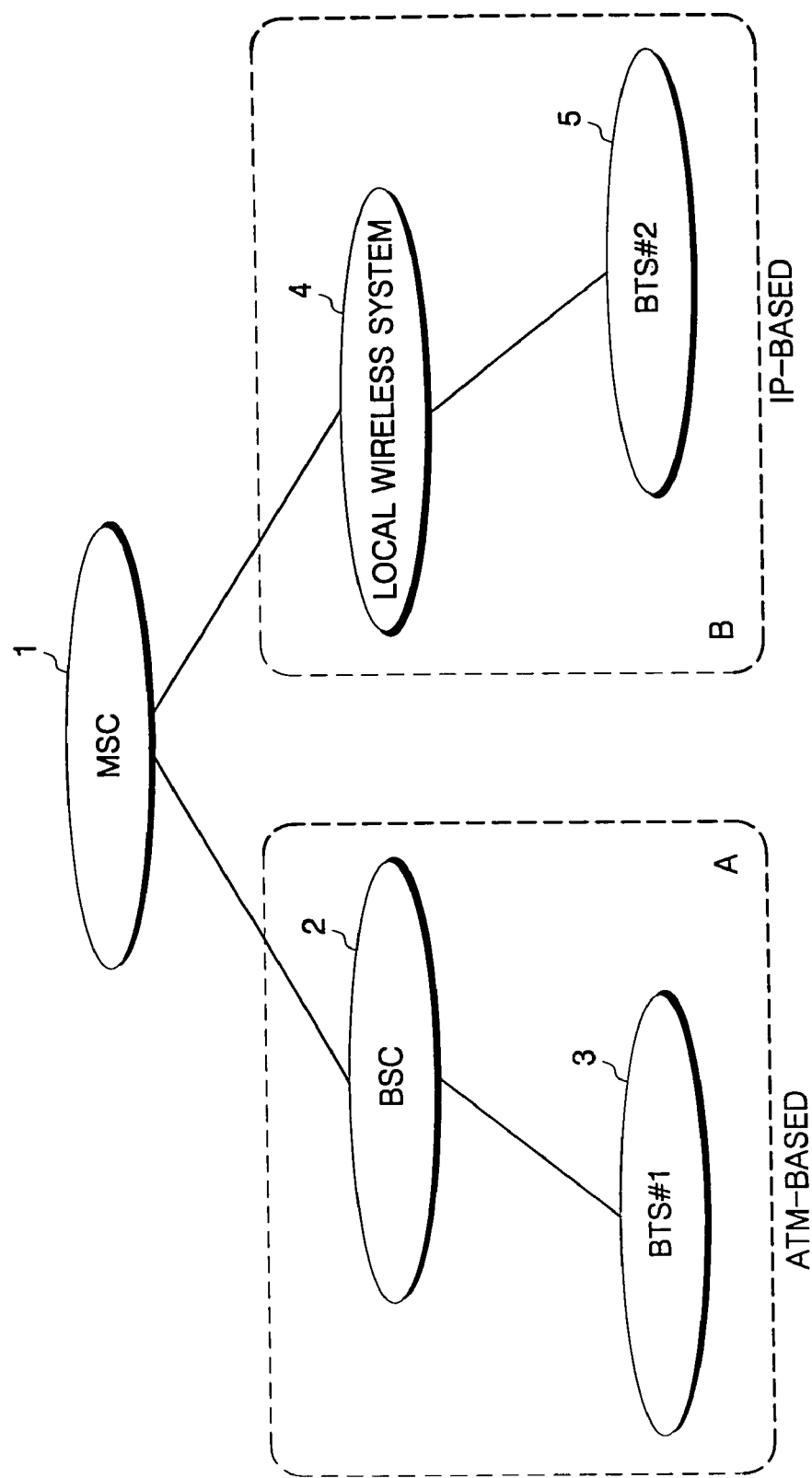
FIG. 1 is a diagram showing a configuration of a system that operates a second mobile communication network that is interlocked with a first mobile communication network in an MSC (Mobile Switching Center) stage.

Studies of interlocking an MSC stage of a public mobile communication network with an IP mobile communication network are actively undertaken and an example of a network interlocking concept of such scheme is shown in FIG. 1.

Referring to FIG. 1, a proposed system is composed of an ATM-based first mobile communication network A including MSC 1, BSC 2 and BTS#1 3 and an IP-based second, independent, mobile communication network B including a local wireless system 4 and BTS#2 5.

When designing the second mobile communication network B that is independent from the first mobile communication network A, the second mobile communication network B is interlocked with the MSC 1 through the first mobile communication network A and an IS-41 interface.

However, in such a configuration, even though it is possible to design the second mobile communication network B independently from the design configuration of the first mobile communication network A since the network B is interlocked with the IS-41 interface through the first mobile communication network A and the MSC 1, there may occur problems that a hard handoff which has a low possibility of success between networks through the MSC 1 occurs in the case that a wireless terminal (not shown) moves between first mobile communication network area A and second mobile communication network area B, and a communication protocol between different networks is conflicted.

On the other hand, a method for interlocking a BSC stage of the public mobile communication network with the mobile communication network was filed for a patent by the same applicant, Samsung Electronic, and registered as a national patent registration No. 0365790.

Figure 2:
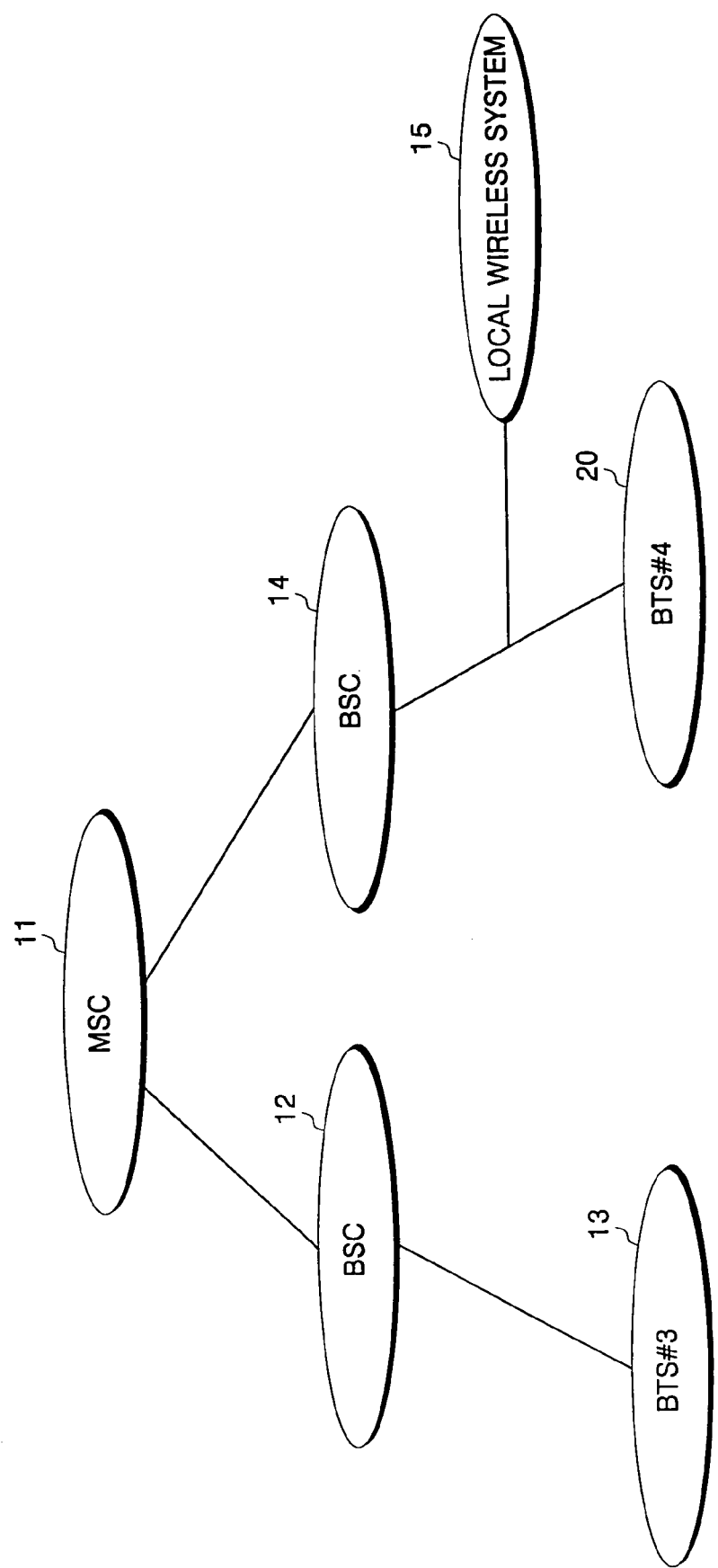
FIG. 2 is a diagram showing a configuration of a system that operates a second mobile communication network that is interlocked with a first mobile communication network in a BSC (Base Station Controller) stage.

A proposed interlocking concept using such method is shown in FIG. 2.

Referring to FIG. 2, the network is composed of a first mobile communication network including an MSC 11, BSCs 12 and 14, a BTS#3 13, and a BTS#4 20, and a second mobile communication network including a local wireless system 15 existing between the BSC 14 and the BTS#4 20 of the first mobile communication network. In this case, the local wireless system 15 has a configuration that it shares the first mobile communication network and the BTS#4 20.

That is, when a wireless terminal (not shown) transmits a signal to the BTS#4 20, the BTS#4 20 directly transmits the signal to the local wireless system 15, and the local wireless system 15 determines which one of the first and second mobile communication networks the wireless terminal wishes to use. And, when the wireless terminal wishes to use the first mobile communication network, the local wireless system 15 transparently transmits the signal to the first mobile communication network, and transmits the signal to the second mobile communication network when desiring to use the second mobile communication network.

However, since the BTS#4 20 interlocks with the BSC 14 of the existing first mobile communication network in such a configuration, the wireless terminal has an advantage in processing the soft handoff and communication protocol but it remarkably depends on the existing first mobile communication network. That is, when the existing first mobile communication network is a system based on ATM, the second mobile communication network interlocked with the first mobile communication network also has to be designed with a system based on ATM. If it is intended that the second mobile communication network is designed on the basis of IP in such network configuration, a device should be added, which converts an IP signal directed to the first mobile communication network to an ATM signal and transmits the converted signal in the local wireless system. However, this makes the configuration of the system complicated and delays a signal processing time.

Figure 3:
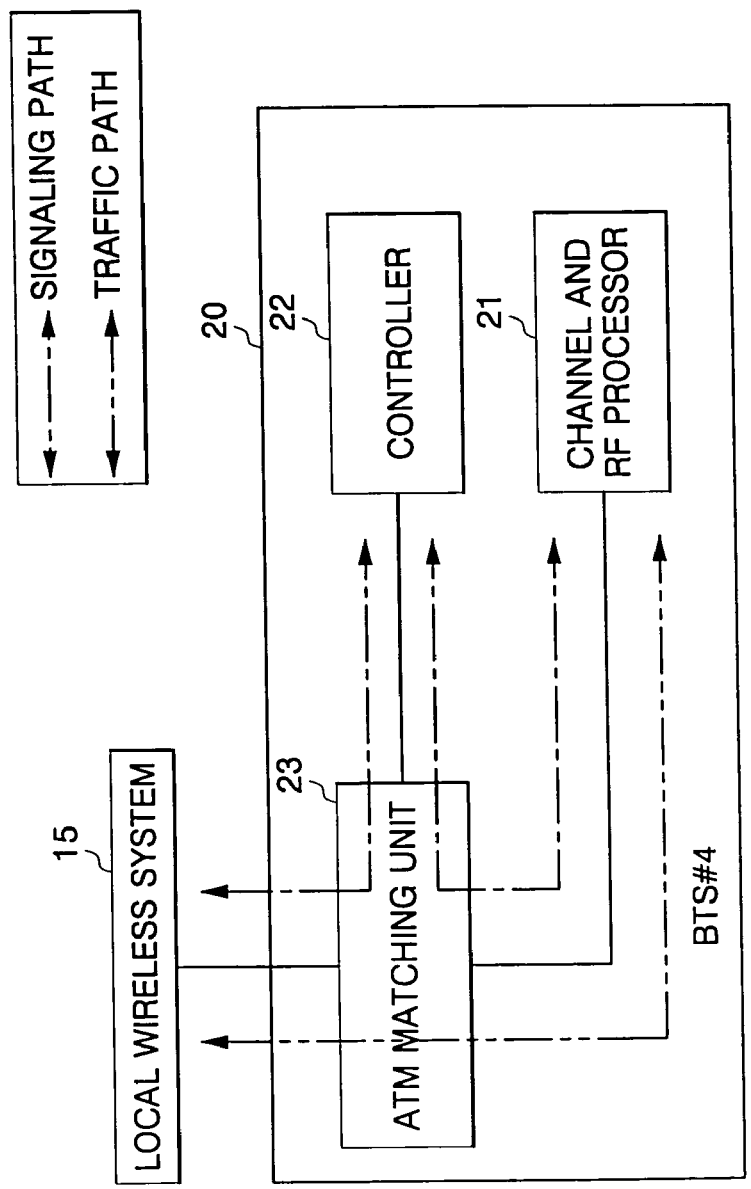
FIG. 3 is a block diagram showing a configuration of the BTS (Base Station Transceiver) shown in FIG. 2.

Meanwhile, a BTS configuration used in such configuration is shown in FIG. 3.

Referring to FIG. 3, the BTS#4 20 includes a channel and RF processor 21, a controller 22, and an ATM matching unit 23.

The channel and RF processor 21 takes charge of processing physical connection protocol as well as RF transmission and reception in connection with the wireless terminal, and is shared by the first and second mobile communication networks based on the ATM.

When processing signals of Layer 2 or Layer 3 with the wireless terminal, the controller 22 authenticates whether a wireless terminal is one belonging to its own service area when the wireless terminal attempts connection. And, the controller 22 transmits the signals to the second mobile system 15 through the ATM matching unit 23 when the wireless terminal is a target of service of the controller 22.

The ATM matching unit 23 provides a protocol used to connect the first and second mobile communication networks based on each other's ATM.

Reviewing a call processing operation in the BTS#4 20 constructed as described above, a response call to an originating call or a call received from the wireless terminal is received by channel and RF processor 21 which is matched with an antenna (not shown) of the BTS#4 20. Channel and RF processor 21 processes only a physical layer on a protocol which is wirelessly connected to the wireless terminal and transmits the layer to controller 22.

The controller 22 performs an analysis of Layer 2 and Layer 3 of the wireless connection protocol with respect to the received signal and determines whether the corresponding wireless terminal is a target of service of controller 22 and whether to provide the service. If the corresponding wireless terminal is the target of service of controller 22 as a result of the determination, controller 22 transmits to the ATM matching unit 23 and then to the second mobile communication network.

Figure 4:
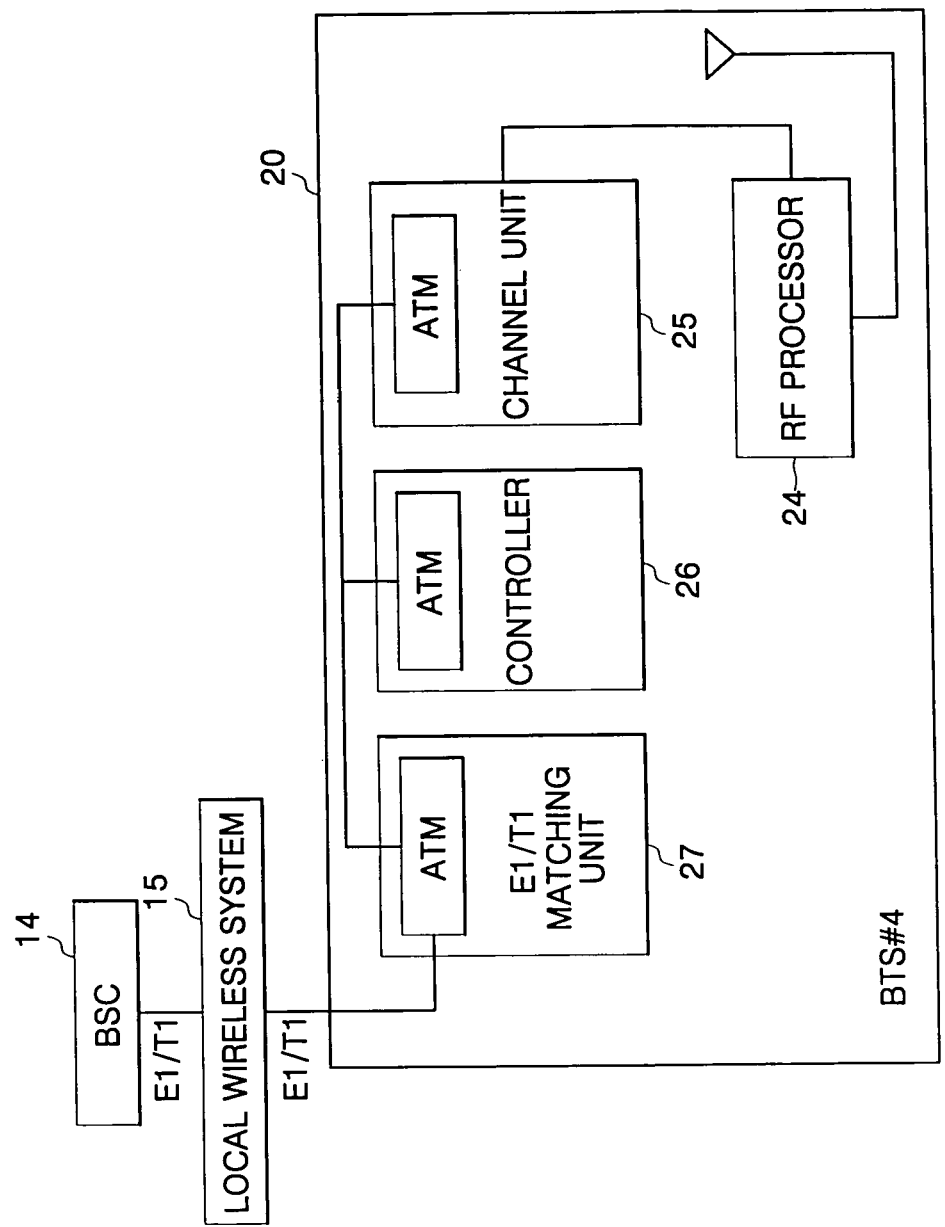
FIG. 4 is a block diagram showing a configuration of the BTS shown in FIG. 3 in a hardware format.

FIG. 4 is a block diagram showing a configuration of BTS#4 20 shown in FIG. 3 in a hardware format. When BTS#4 20 that is shown in FIG. 3 is embodied in the hardware format, it may include an RF processor 24 for performing a wireless signal process, a channel unit 25 for performing channel assignment and distribution, a controller 26 for authenticating whether the corresponding wireless terminal is a target of service, and an E1/T1 matching unit 27 for matching with a second mobile system 15 through the E1/T1 link. At this time, the channel unit 25, the controller 26 and the E1/T1 matching unit 27 basically have an ATM module since they are based on the ATM.

Figure 5:
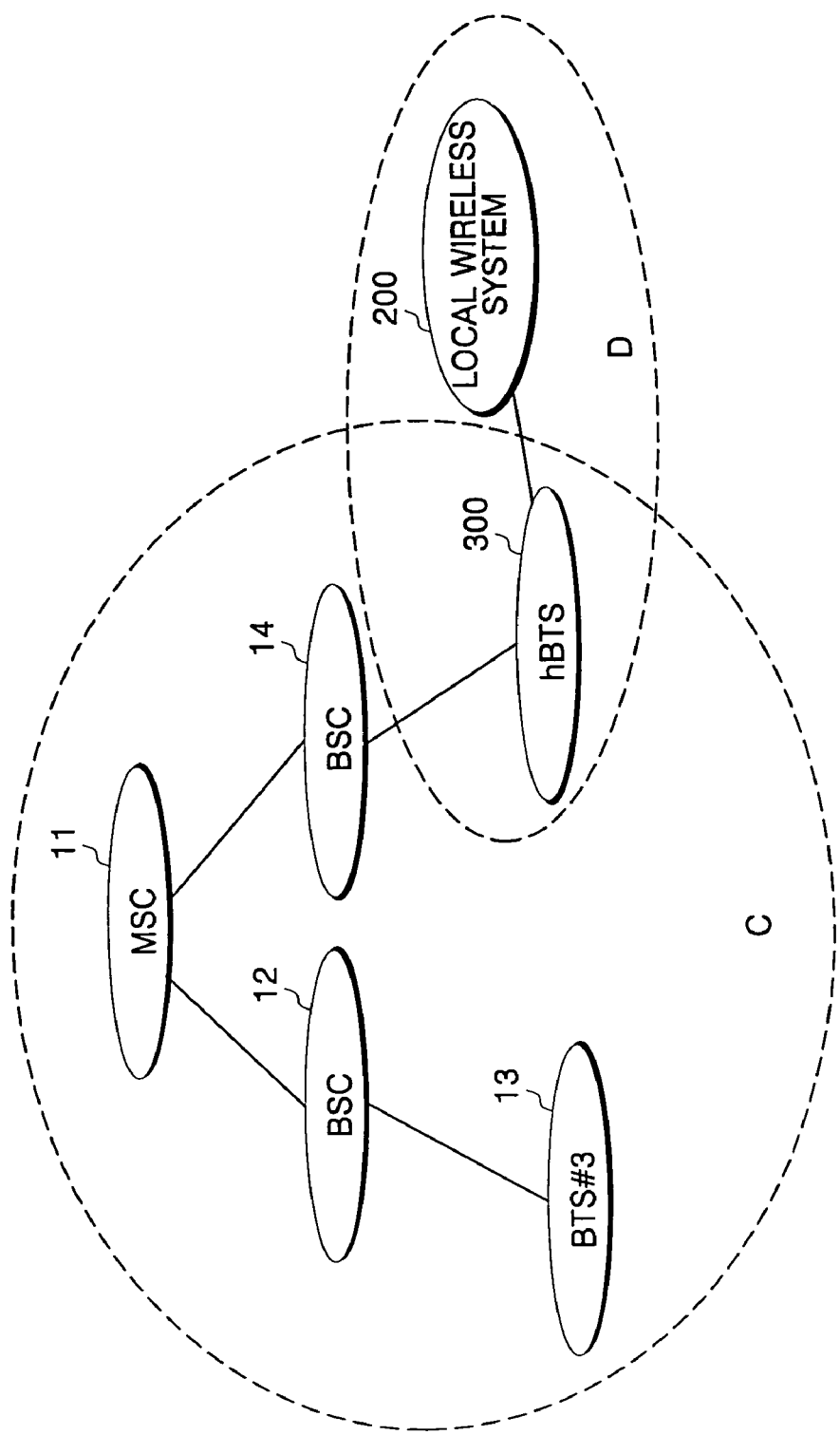
FIG. 5 is a diagram showing a configuration of a system where an existing mobile communication network is interlocked with an IP (Internet Protocol) mobile communication network through a hybrid base station transceiver (hBTS) in accordance with the present invention.
Figure 6:
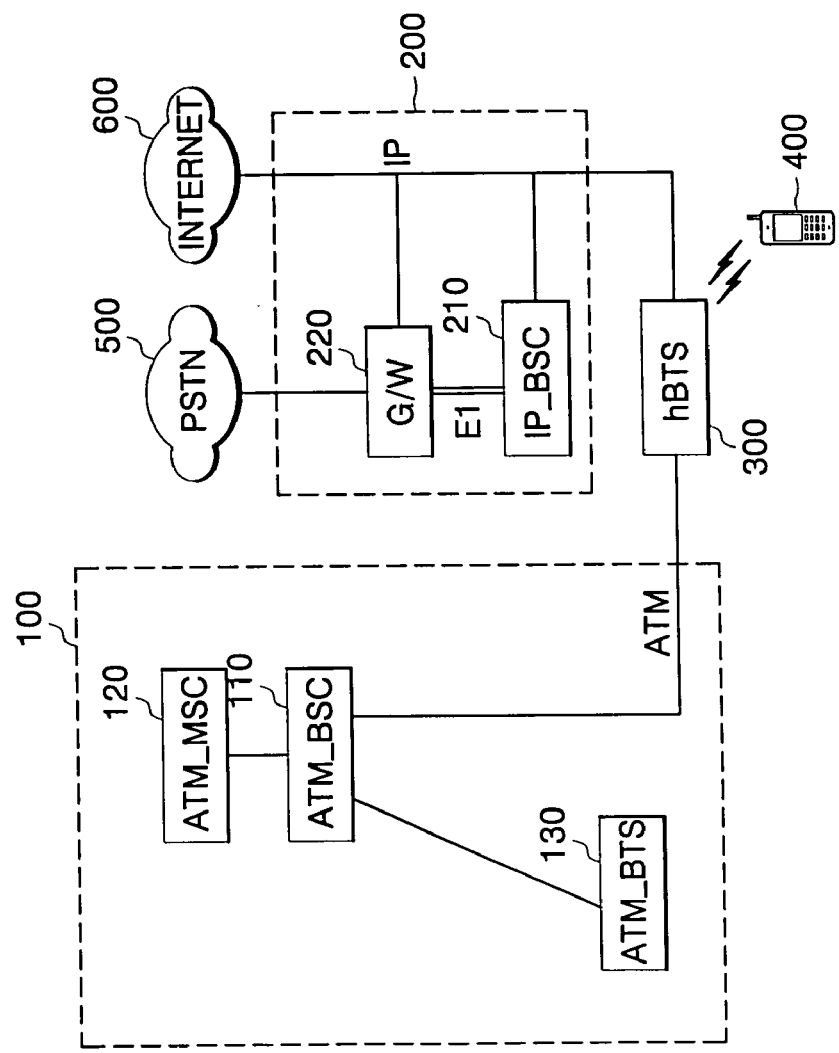
FIG. 6 is a block diagram showing a configuration of a wireless communication network employing an hBTS in accordance with the present invention.

FIG. 5 is a diagram showing a network configuration of a mobile communication system including a hybrid base station transceiver in accordance with the present invention, and FIG. 6 is a diagram showing an embodiment of a mobile communication system in accordance with the network configuration diagram shown in FIG. 5.

Referring to FIG. 5, the hybrid base station transceiver in accordance with the present invention comprises a first mobile communication network (C area) consisting of an MSC 11, BSCs 12 and 14, a BTS#3 13 and an hBTS 300, and a second mobile communication network (D area) consisting of a local wireless system 200 and hBTS 300.

As shown in the drawing, hBTS 300 has a configuration where it is shared by the first mobile communication network C and the second mobile communication network D. Here, the local wireless system 200 may include a local mobile communication network, a private mobile communication network, or a wired or wireless communication network.

In the mobile communication system in accordance with the present invention, when a mobile communication subscriber, who is in the coverage area of hBTS 300, tries to make a call through its wireless terminal, hBTS 300 determines which one of the first mobile communication network C and the second mobile communication network D the subscriber wishes to use.

When the subscriber wishes to use the first mobile communication network C, call processing corresponding to the first mobile communication network C is performed, and when the subscriber wishes to use the second mobile communication network D, call processing corresponding to the second mobile communication network D is performed. Therefore, the mobile communication networks supporting different communication protocols are interlocked smoothly and effectively.

The system shown in FIG. 6 is a more concretely embodied example of FIG. 5. Referring to FIG. 6, a mobile communication system in accordance with the present invention includes a first mobile communication network 100 based on the ATM protocol consisting of an ATM_BSC 110, an ATM_MSC 120 and an ATM_BTS 130; a second communication network (local wireless system) 200 based on the IP protocol consisting of an IP_BSC 210 and a gateway 220; a hBTS (hybrid base station transceiver) 300 supporting both the ATM-based first mobile communication network 100 and the IP-based second mobile communication network 200; and a wireless terminal 400. The second mobile communication network 200 is connected to a PSTN (Public Switched Telephone Network) 500 through the gateway 220, and connected to an Internet 600 through the IP.

At this time, the ATM-based first mobile communication network 100 and the IP-based second mobile communication network 200 consist of separate networks and share the hBTS 300.

When the wireless terminal 400 tries to make a call, the hBTS 300 determines which one of the ATM-based first mobile communication network 100 and the IP-based second mobile communication network 200 the wireless terminal 400 wishes to use, for example, using a method of confirming a specified part of a call request message. And, when the wireless terminal 400 wishes to use the ATM-based first mobile communication network 100, the hBTS 300 performs the call processing in the ATM-based first mobile communication network 100, and it performs the call processing in the IP-based second mobile communication network 200 when the wireless terminal 400 wishes to use the IP-based second mobile communication network 200.

IP_BSC 210 in the IP-based second mobile communication network 200 processes a signal received from the hBTS 300, allocates wireless resources, and provides the wireless terminal with the IP-based mobile communication service in the service area. Also, the IP_BSC 210 is connected to a wired public network PSTN (Public Switched Telephone Network) 500 through the gateway 220 which can be embodied with a private exchange (PBX) and an access gateway, and is directly connected to an external IP network 600 (Internet, etc) not through the gateway 220 when the call is an IP-based call such as a VoIP (Voice over Internet Protocol) call and a data call.

Meanwhile, the ATM_BSC 110 of the first mobile communication network receives an ATM signal coming from the hBTS 300, allocates the wireless resources, and provides the ATM-based mobile communication service.

Figure 7:
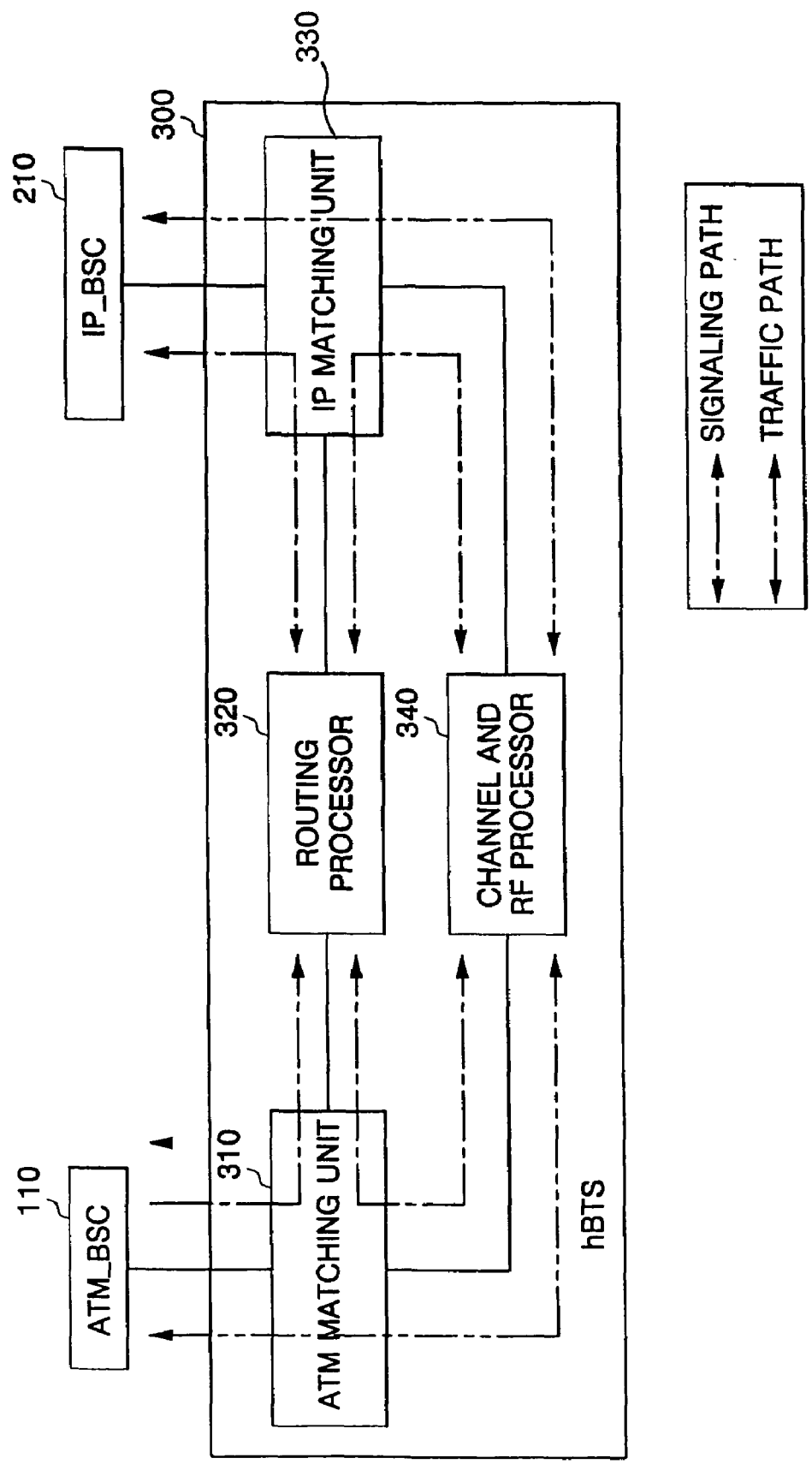
FIG. 7 is a block diagram showing a configuration of an hBTS in accordance with the present invention.

FIG. 7 is a block diagram showing a configuration of an hBTS 300 in accordance with the present invention.

Referring to FIG. 7, the hBTS 300 includes an ATM matching unit 310, a routing processor 320, an IP matching unit 330, and a channel and RF processor 340.

The ATM matching unit 310 provides an ATM protocol used to make a connection to the ATM-based first mobile communication network 100.

The routing processor 320 performs a function to determine a network to which the corresponding wireless terminal 400 wishes to connect by analyzing the signal received from the wireless terminal 400 when the signals of Layer 2 or Layer 3 are processed with respect to the wireless terminal, and to connect the wireless terminal 400 to the first mobile communication network 100 or the second mobile communication network 200.

For example, if the signal received from the wireless terminal 400 has a desired called party's phone number (a phone number of a wired telephone, an extension number, a phone number of a mobile communication terminal, etc.), the routing processor 320 determines whether an identifier (for example, #, *, etc.) indicating a request for the connection to the second mobile communication network 200 is added to the phone number. At this time, if the identifier is added to the phone number, the routing processor 320 sends a call request signal including the phone number to the second mobile communication network 200 to establish a traffic channel, thus enabling communication between the wireless terminal 400 and the called party using the second mobile communication network 200.

If the identifier is not added to the phone number from the wireless terminal 400, the routing processor 320 determines that the wireless terminal 400 desires a connection to the first mobile communication network 100, and then sends a call request signal including the phone number to the first mobile communication network 100 to establish a traffic channel, thus enabling communication using the first mobile communication network 100.

For example, if the signal received from the wireless terminal 400 has a phone number "#212", the routing processor 320 determines that the wireless terminal 400 desires to use the second mobile communication network 200, because an identifier "#" indicating a request for the use of the second mobile communication network 200 is added to the phone number. Therefore, the routing processor 320 sends a call request signal including the phone number "212" to the second mobile communication network 200, thus enabling the wireless terminal 400 to communicate with an extension telephone subscriber using an extension number "212" through the second mobile communication network 200.

Further, if the signal received from the wireless terminal 400 has a phone number "#02-212-8866", the routing processor 320 determines that the wireless terminal 400 desires to use the second mobile communication network 200, because the identifier "#" indicating a request for the use of the second mobile communication network 200 is added to the phone number. Therefore, the routing processor 320 sends a call request signal including the phone number "02-212-8866" to the second mobile communication network 200, thus enabling the wireless terminal 400 to communicate with a PSTN subscriber using the phone number "02-212-8866" over the PSTN through the second mobile communication network 200.

Further, if the signal received from the wireless terminal 400 has a phone number "#016-212-8866", the routing processor 320 determines that the user desires to use the private mobile communication service, because the identifier "#" indicating a request for the use of the second mobile communication network 200 is added to the phone number. Therefore, the routing processor 320 sends a call request signal including the phone number "016-212-8866" to the second mobile communication network 200, thus enabling the wireless terminal 400 to communicate with a subscriber using the phone number "016-212-8866" via the second mobile communication network 200.

On the contrary, if the signal received from the wireless terminal 400 has a phone number "02-212-8866" having no identifier "#" indicating a request for the second mobile communication network 200, the routing processor 320 determines that the wireless terminal 400 does not desire to use the second mobile communication network 200, because the identifier "#" is not added to the phone number. Therefore, the routing processor 320 sends a call request signal including the phone number "02-212-8866" to the first mobile communication network 100, thus enabling the wireless terminal 400 to communicate with a subscriber using the phone number "02-212-8866" via the first mobile communication network 100.

The IP matching unit 330 provides an IP protocol used to make a connection to the IP-based second mobile communication network 200.

The channel and RF processor 340 takes charge of a physical connect protocol process and an RF transceiving process with the wireless terminal 400, and is shared by the ATM-based first mobile communication network 100 and the IP-based second mobile communication network 200.

The hBTS 300 uses the ATM method when interlocking with the ATM-based first mobile communication network 100 while supporting both of the ATM and IP, and uses the IP method when interlocking to the IP-based second mobile communication network 200.

To do this, the routing processor 320 determines which one of the ATM-based first mobile communication network 100 and the IP-based second mobile communication network 200 the call of the wireless terminal 400 wishes to make a connection to, and processes it with a corresponding communication scheme in each of the networks.

And, the routing processor 320 determines which one of the ATM-based first mobile communication network 100 and the IP-based second mobile communication network 200 voice and data traffics are to be transmitted to, and transmits the voice and data traffics in an appropriate method.

Therefore, it is possible to provide services of all methods provided by the ATM-based first mobile communication network 100 without any restriction, and various kinds of services provided by the IP-based second communication network 200.

Reviewing the call processing procedure briefly, an originating signal received from the wireless terminal 400 or a response call with respect to a call is received from the channel and RF processor 340 that is matched with an antenna (not shown) of the hBTS 300. The channel and RF processor 340 processes only a physical layer on a protocol that is wirelessly connected to the wireless terminal 400 and transmits it to the routing processor 320.

The routing processor 320 performs an analysis of the Layer 2 and Layer 3 on the wireless connection protocol with respect to the received signal and determines which one of the ATM-based first mobile communication network 100 and the IP-based second mobile communication network 200 the signal is to be transmitted to. When transmitting the signal to the ATM-based first mobile communication network 100 as a result of the determination, the signal is to be transmitted to the ATM matching unit 310 and then to the ATM_BSC 110 of the ATM-based first mobile communication network 100.

On the other hand, when transmitting the signal to the IP-based second mobile communication network 200, the signal is transmitted to the IP matching unit 330 and then to the IP-BSC 210 of the IP-based second mobile communication network 200.

Also, a case can be assumed that the wireless terminal 400 is connected to the ATM-based first mobile communication network 100 and is handed off with a base station outside during service.

Even in such a case, since the hBTS 300 uses the same ATM-based communication protocol as the first mobile communication network when the hBTS 300 is connected to the ATM-based first mobile communication network 100, a reliable service can be continuously guaranteed through a soft handoff when performing a handoff with an external base station.

On the other hand, when the wireless terminal is connected to the IP-based second mobile communication network 200, it is possible to use not the conventional ATM-based communication protocol but the IP-based communication protocol that is suitable to the second mobile communication network 200 since the wireless terminal provides only the corresponding area with service and so does not need to perform a hand off with the external base station.

Figure 8:
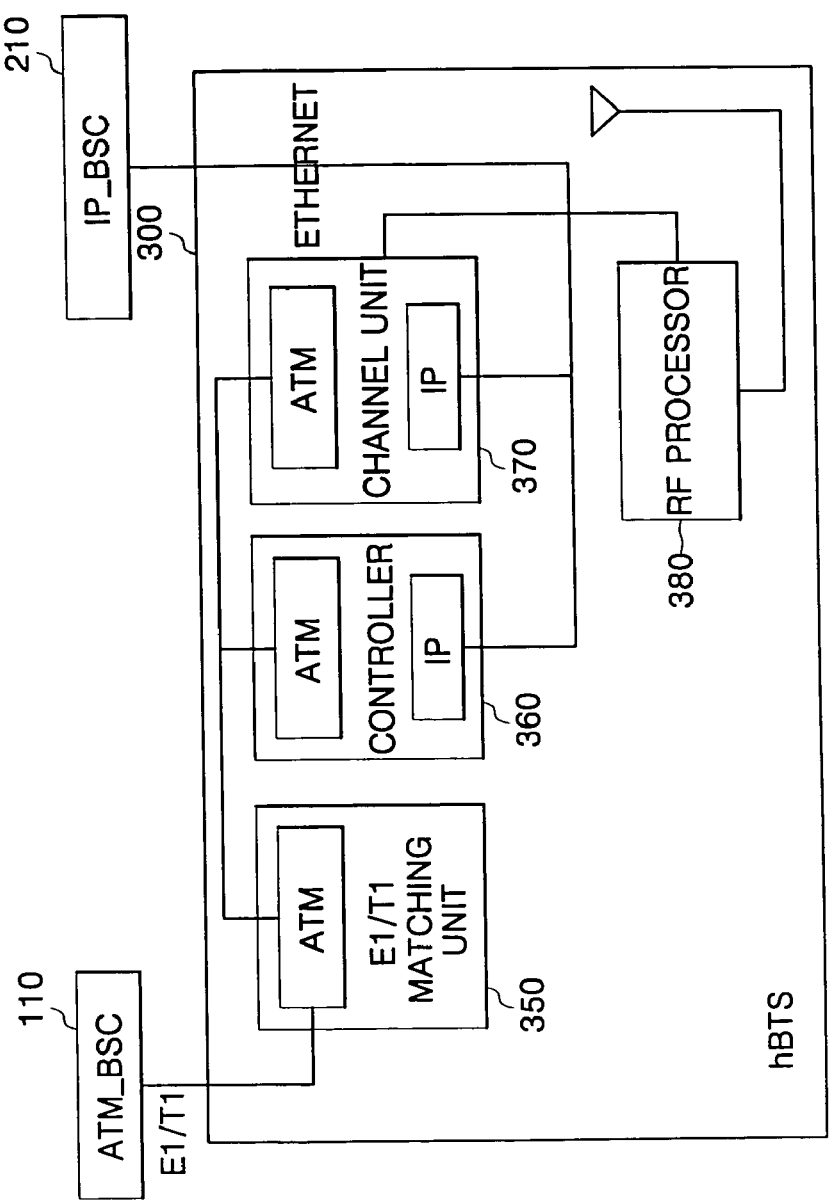
FIG. 8 is a block diagram showing a configuration of the hBTS shown in FIG. 7 in a hardware format.

FIG. 8 is a block diagram showing a configuration of the hBTS 300 shown in FIG. 7 in a hardware format. Referring to FIG. 8, the hBTS 300 includes an E1/T1 matching unit 350 to match with the ATM_BSC 110 of the first mobile communication network through the E1/T1 link in the hardware format, a controller 360 for authenticating whether the corresponding wireless terminal is a target of service and performing a routing process, a channel unit 370 for performing the channel assignment and distribution, and an RF processor 380 for performing a wireless signal process.

The E1/T1 matching unit 350, the controller 360, and the channel unit 370 have an ATM module used to interlock with the ATM_BSC 110 of the ATM-based first mobile communication network 100.

The controller 360 and the channel unit 370 also have an IP module used to interlock with the IP_BSC 210 of the IP-based second mobile communication network 200, and are connected to the second mobile communication network 200 through the IP module using an Ethernet.

FIGS. 9 and 10 are call flowcharts performing call processing of a wireless terminal using an hBTS in accordance with the present invention. A procedure for performing the call processing in the wireless system in accordance with the present invention will be described with reference to FIGS. 9 and 10.

FIG. 9 is a call flowchart showing the case that the wireless terminal is connected to an ATM-based mobile communication network.

Referring to FIG. 9, a signal, i.e., an originating call or a call response with respect to an originating call from wireless terminal 400, is received by channel and RF processor 340 that is matched with an antenna of the hBTS 300 (S1). The channel and RF processor 340 processes only a physical layer on a protocol of the signal that is wirelessly connected to the wireless terminal 400 (S2), and transmits the signal to routing processor 320 (S3). The routing processor 320 performs an analysis of the Layer 2 and Layer 3 on the wireless connection protocol with respect to the signal transmitted from channel and RF processor 340 and determines which one of the ATM-based first mobile communication network 100 and the IP-based second mobile communication network 200 the signal is to be transmitted to (S4). When transmitting the signal to the ATM-based mobile communication network 100 as a result of the determination, the signal is transmitted to ATM matching unit 310 and then to the ATM_BSC 110 of the ATM-based first mobile communication network 100 (S5).

The ATM_BSC 110 of the first mobile communication network 100 receives the originating/call response signal from the hBTS 300 and then provides a speech channel assignment request to the routing processor 320 through ATM matching unit 310 (S6). Accordingly, the routing processor 320 provides the speech channel assignment request to channel and RF processor 340 according to the speech channel assignment request received from ATM_BSC 110 of the first mobile communication network 100 (S7).

The channel and RF processor 340 sets a flag of the first mobile communication network on a table in the channel and RF processor 340 and assigns the speech channel (St.), and sends speech channel assignment information to the routing processor 320. And, the routing processor 320 transmits the speech channel assignment information to the ATM_BSC 110 of the first mobile communication network 100 through the ATM matching unit 310 (S10).

The ATM_BSC 110 of the first mobile communication network 100 then transmits a channel assignment message to the wireless terminal 400 through the hBTS 300 (S11) according to the speech channel assignment information received from the hBTS 300.

The wireless terminal 400 transmits the voice or data (reverse) traffic to the hBTS 300 according to the channel assignment message that the terminal 400 received from the AT_BSC 110 of the first mobile communication network 100 through the hBTS 300 (S12). When reverse traffic is received from the wireless terminal 400, the channel and RF processor 340 determines whether the corresponding traffic should be forwarded to the first mobile communication network on the basis of the set flag on the traffic (S13), and transmits the received traffic to the ATM_BSC 110 of the first mobile communication network through the ATM matching unit 310. On the other hand, in the case of forward traffic transmitted from the ATM_BSC 110 of the first mobile communication network 100 to the wireless terminal 400, the traffic is transmitted to the wireless terminal 400 through the ATM matching unit 310 and the channel and RF processor 340.

FIG. 10 is a call flowchart of the case that a connection is made to the IP-based second mobile communication network in accordance with the present invention.

Referring to FIG. 10, a signal, i.e., an originating call or a call response with respect to an originating call from wireless terminal 400, is received by channel and RF processor 340 that is matched with an antenna of the hBTS 300 (S21). The channel and RF processor 340 processes only the physical layer on the protocol that is wirelessly connected to the wireless terminal 400 (S22) and transmits it to routing processor 320 (S23). The routing processor 320 performs an analysis of the Layer 2 and Layer 3 on the wireless connection protocol with respect to the signal received from channel and RF processor 340 and determines which one of the ATM-based first mobile communication network 100 and the IP-based second mobile communication network 200 the signal is to be transmitted to (S24). And, when transmitting the signal to the IP-based second mobile communication network 200 as a result of the determination, the signal is transmitted to the IP matching unit 330 and then to the IP_BSC 210 of the IP-based second mobile communication network 200 (S25).

The IP_BSC 210 of the second mobile communication network 200 receives the originating/call response signal from the hBTS 300 and then transmits a speech channel assignment request to routing processor 320 through the IP matching unit 330 so as to be assigned the speech channel of the hBTS 300 (S26). Accordingly, the routing processor 320 sends the speech channel assignment request to channel and RF processor 340 according to the speech channel assignment request received from the IP_BSC 210 of the second mobile communication network (S27).

The channel and RF processor 340 sets a flag of the second mobile communication network in a table that the processor 340 has and assigns the speech channel in the table (S28), and transmits speech channel assignment information to routing processor 320 (S29). Routing processor 320 transmits the speech channel assignment information to the IP_BSC 210 of the second mobile communication network 200 through the IP matching unit 330 (S30).

The IP_BSC 210 of the second mobile communication network 200 transmits a channel assignment message to the wireless terminal 400 through the hBTS 300 according to the speech channel assignment information transmitted from the hBTS 300 (S31).

The wireless terminal 400 transmits (S32) the voice or data (reverse) traffic to the hBTS 300 according to the channel assignment message that the terminal 400 received from the second mobile communication 200 through the hBTS 300. When channel and RF processor 340 receives the reverse traffic from wireless terminal 400, it sees the flag that the traffic has and then determines that the network to which the corresponding traffic should go is the IP-based second mobile communication network 200 (S33). And, the channel and RF processor 340 transmits (S34) the received reverse traffic from wireless terminal 400 to IP_BSC 210 of the second mobile communication network 200 through IP matching unit 330. Meanwhile, in the case of forward traffic that the traffic is transmitted from the second mobile communication network 200 to the wireless terminal 400, the traffic is transmitted to the wireless terminal 400 through the IP matching unit 330 and the channel and RF processor 340.

According to a hybrid base station transceiver in accordance with the present invention, in a first mobile communication network and a second mobile communication network that use a different kind of communication protocol, an IP-based second mobile communication network can be operated independently on a communication basis used in an ATM-based first mobile communication network, and a reliable service can be continuously guaranteed through a soft handoff even when hand off is performed with an ATM-based first mobile communication network. According to the hybrid base station transceiver in accordance with the present invention, it is possible to construct a low cost and small second mobile communication network by constructing the second mobile communication network on the basis of the IP even though the first mobile communication network is constructed on the basis of the ATM, and it is possible to service a wireless data service using an Intranet or Internet as well as a voice service through an IP-based second mobile communication network more efficiently.

What is claimed is:

1. A hybrid base station transceiver comprising:
   a first matching unit for processing a first protocol used to connect to a first mobile communication network;
   a second matching unit for processing a second protocol used to connect to a second mobile communication network, said second protocol being different from said first protocol;
   a channel and RF (radio frequency) processor for performing a physical connection protocol process and an RF transceiving process with a wireless terminal; and
   a routing processor for determining a network to which a corresponding wireless terminal wishes to connect by analyzing a signal received from the wireless terminal and for connecting the wireless terminal to the determined one of the first and second mobile communication networks when a signal of open system interconnection (OSI) Layer 2 or Layer 3 is processed with the wireless terminal connected through the channel and RF processor.

2. A hybrid base station transceiver comprising:
   an ATM (asynchronous transfer mode) matching unit for processing an ATM protocol used to connect to an ATM-based first mobile communication network;
   an IP (Internet protocol) matching unit for processing an IP protocol used to connect to an IP-based second mobile communication network;
   a channel and RF (radio frequency) processor for performing a physical connection protocol process and an RF transceiving processing with a wireless terminal; and
   a routing processor for determining a network to which a corresponding wireless terminal wishes to connect by analyzing a signal received from the wireless terminal and for connecting the wireless terminal to the detected one of the ATM-based first mobile communication network and the IP-based second mobile communication network when a signal of open system interconnection (OSI) Layer 2 or Layer 3 is processed with the wireless terminal connected through the channel and RF processor.

3. The hybrid base station transceiver according to claim 2, wherein the hybrid base station transceiver is interlocked with both the first mobile communication network providing an ATM (asynchronous transfer mode) based mobile communication service; and
   the second mobile communication network providing an IP (Internet protocol) based mobile communication service.

4. The hybrid base station transceiver according to claim 3, wherein the hybrid base station transceiver determines which one of the first mobile communication network and the second mobile communication network a wireless terminal is to connect to when the wireless terminal tries to make a call through the hybrid base station transceiver, and performs the ATM scheme call processing when the wireless terminal tries to connect to the ATM-based first mobile communication network and performs the IP scheme call processing when the wireless terminal tries to connect to the second mobile communication network.

5. The system according to claim 3, wherein the hybrid base station transceiver performs a soft handoff with an external base station using the same ATM-based communication protocol as the first mobile communication network, when the wireless terminal is connected to the ATM-based first mobile communication network and is handed off with said external base station during service.

6. A method for performing call processing in a hybrid base station transceiver, the method comprising:
   processing a physical layer on a wireless connection protocol with respect to a signal corresponding to any one of a call to a wireless terminal or a call received from the wireless terminal;

performing an analysis of open system interconnection (OSI) Layer 2 and Layer 3 on the wireless connection protocol with respect to the signal and determining which one of a first protocol-based first mobile communication network and a second protocol-based second mobile communication network the signal is to be transmitted to; and transmitting the signal to the first mobile communication network by performing first protocol processing when transmitting the signal to the first mobile communication network as a result of the determination, and transmitting the signal to the second mobile communication network by performing second protocol processing when transmitting the signal to the second mobile communication network as a result of the determination, said first protocol processing being different from said second protocol processing.

7. The method according to claim 6, further comprising setting a flag for transmitting corresponding traffic to one of the first mobile communication network and the second mobile communication network in response to a speech channel assignment request from one of the first mobile communication network and the second mobile communication network and assigning a speech channel.

8. The method according to claim 7, further comprising, when receiving reverse traffic from the wireless terminal, transmitting corresponding traffic to one of the first mobile communication network and the second mobile communication network according to the set flag.

9. The method according to claim 6, said first protocol processing being an ATM (asynchronous transfer mode) processing scheme, and said second protocol processing being an IP (Internet protocol) processing scheme.

* * * * *